US011221992B2

(12) United States Patent
Akelbein et al.

(10) Patent No.: US 11,221,992 B2
(45) Date of Patent: *Jan. 11, 2022

(54) STORING DATA FILES IN A FILE SYSTEM

(71) Applicant: International Business Machines Corporation, Armonk, NY (US)

(72) Inventors: Jens-Peter Akelbein, Nackenheim (DE); Nils Haustein, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 155 days.

This patent is subject to a terminal disclaimer.

(21) Appl. No.: 16/564,714

(22) Filed: Sep. 9, 2019

(65) Prior Publication Data
US 2019/0391961 A1    Dec. 26, 2019

Related U.S. Application Data

(63) Continuation of application No. 15/843,468, filed on Dec. 15, 2017, now Pat. No. 10,409,777, which is a
(Continued)

(30) Foreign Application Priority Data

Nov. 7, 2012    (GB) ...................... 1220084

(51) Int. Cl.
*G06F 16/00* (2019.01)
*G06F 16/174* (2019.01)
*G06F 16/16* (2019.01)

(52) U.S. Cl.
CPC .......... *G06F 16/1744* (2019.01); *G06F 16/16* (2019.01); *G06F 16/1756* (2019.01)

(58) Field of Classification Search
None
See application file for complete search history.

(56) References Cited

U.S. PATENT DOCUMENTS 6,018,747 A    1/2000 Burns et al.
6,088,694 A    7/2000 Burns et al.
(Continued)

FOREIGN PATENT DOCUMENTS

AU    2012201150 A1    3/2012
CA       2531413 A1    1/2005
(Continued)

OTHER PUBLICATIONS

Combined Search and Examination Report under Sections 17 and 18(3) dated Mar. 6, 2013, Application No. GB1318696.0, 5 pages.
(Continued)

*Primary Examiner* — Augustine K. Obisesan
(74) *Attorney, Agent, or Firm* — Stephen R. Tkacs; Stephen J. Walder, Jr.; Robert M. Sullivan (57) ABSTRACT

A mechanism is provided for storing data files in a file system. The file system provides a plurality of reference data files, where each reference data file in the plurality of data files represents a group of similar data files. The mechanism creates a new data file and associated the new data file with one reference data file in the plurality of data files thus defining an associated reference data file of the plurality of reference data files. The mechanism informs the file system about the association of the new data file with the associated reference data file. The mechanism compresses the new data file using the associated reference data file thereby forming a compressed data file. The mechanism stores the compressed data file together with information about the association of the new data file with the associated reference data file.

20 Claims, 7 Drawing Sheets

Related U.S. Application Data continuation of application No. 15/075,575, filed on Mar. 21, 2016, now Pat. No. 9,922,041, which is a continuation of application No. 14/019,014, filed on Sep. 5, 2013, now Pat. No. 9,355,108.

(56) References Cited

U.S. PATENT DOCUMENTS

| | | | |
|---|---|---|---|
| 6,460,044 | B1 | 10/2002 | Wang |
| 6,466,999 | B1 | 10/2002 | Sliger et al. |
| 6,816,872 | B1* | 11/2004 | Squibb .................. G06F 16/10 |
| 6,886,161 | B1 | 4/2005 | Garvin |
| 7,277,899 | B1 | 10/2007 | Salyzyn |
| 7,865,479 | B2 | 1/2011 | Gu et al. |
| 7,908,302 | B1 | 3/2011 | Nagarula |
| 8,135,683 | B2 | 3/2012 | Douglis et al. |
| 8,825,652 | B1 | 9/2014 | Faibish et al. |
| 2001/0007989 | A1 | 7/2001 | Mittal et al. |
| 2002/0033762 | A1 | 3/2002 | Belu |
| 2003/0149793 | A1 | 8/2003 | Bannoura et al. |
| 2005/0114381 | A1 | 5/2005 | Borthakur et al. |
| 2005/0216433 | A1 | 9/2005 | Bland et al. |
| 2006/0075004 | A1* | 4/2006 | Stakutis .................. G06F 16/10 |
| 2006/0200470 | A1 | 9/2006 | Lacapra et al. |
| 2006/0242157 | A1* | 10/2006 | McCuller ................ H04L 69/04 |
| 2006/0277217 | A1 | 12/2006 | Lehikoinen et al. |
| 2007/0250540 | A1 | 10/2007 | Hsu |
| 2008/0104649 | A1 | 5/2008 | Naaman et al. |
| 2008/0183739 | A1 | 7/2008 | Pai et al. |
| 2008/0270729 | A1 | 10/2008 | Reddy et al. |
| 2009/0013009 | A1 | 1/2009 | Nakayama |
| 2009/0313342 | A1 | 12/2009 | Thie |
| 2010/0023555 | A1 | 1/2010 | Macaskill |
| 2010/0185986 | A1 | 7/2010 | Quintanilla et al. |
| 2011/0066667 | A1 | 3/2011 | Peeters et al. |
| 2011/0106806 | A1 | 5/2011 | Tamas et al. |
| 2011/0119240 | A1 | 5/2011 | Shapira |
| 2011/0196849 | A1* | 8/2011 | Hays ...................... H03M 7/46 707/693 |
| 2011/0196869 | A1 | 8/2011 | Patterson et al. |
| 2012/0066274 | A1* | 3/2012 | Stephenson .............. G06F 8/65 707/825 |
| 2013/0066868 | A1* | 3/2013 | Hecker ............... H03M 7/3093 707/737 |
| 2013/0177153 | A1 | 7/2013 | Gerraty |
| 2013/0246460 | A1 | 9/2013 | Maltbie et al. |
| 2013/0262704 | A1 | 10/2013 | Jain |
| 2014/0052700 | A1* | 2/2014 | VanderSpek ........ G06F 16/1756 707/693 |

FOREIGN PATENT DOCUMENTS

| | | | | |
|---|---|---|---|---|
| EP | 0339220 | A2 | 11/1989 | |
| EP | 0578205 | A2 | 1/1994 | |
| EP | 1442292 | A2 | 8/2004 | |
| EP | 1371228 | B1 | 5/2007 | |
| EP | 2409232 | A1 | 1/2012 | |
| GB | 2495698 | A * | 4/2013 | ......... G06F 21/6209 |
| JP | 2007193708 | A | 8/2007 | |
| JP | 2008519360 | A | 6/2008 | |
| WO | WO03031565 | A2 | 4/2003 | |
| WO | WO 03/079242 | A1 | 9/2003 | |
| WO | WO 2004/025489 | A1 | 3/2004 | |
| WO | WO 2006/052897 | A2 | 5/2006 | |
| WO | WO 2006/052897 | A3 | 5/2006 | |
| WO | WO 2010/056265 | A1 | 5/2010 | |

OTHER PUBLICATIONS

List of IBM Patents or Patent Applications Treated as Related, Sep. 9, 2019, 2 pages.

"Method for identifying Image Objects With Similar Intent from Multiple Documents to aid Block Level De-duplication in storage clouds", Disclosed Anonymously, www.ip.com, IPCOM000210334D, Aug. 30, 2011, 8 pages.

Afify, Heba et al., "DNA Lossless Differential Compression Algorithm Based on Similarity of Genomic Sequence Database", International Journal of Computer Science & Information Technology (IJCSIT), vol. 3, No. 4, Aug. 2011, pp. 145-154.

Hsi-Yang Fritz, Markus et al., "Efficient storage of high throughput DNA sequencing data using reference-based compression", Genome Research, 21(5), http://www.ncbi.nlm.nih.gov/pmc/articles/PMC3083090/, May 2011, 9 pages.

Liu, Chuanyi et al., "A Novel Optimization Method to Improve De-duplication Storage System Performance", 15th International Conference on Parallel and Distributed Systems (ICPADS), 2009, pp. 228-235.

* cited by examiner

STORING DATA FILES IN A FILE SYSTEM

BACKGROUND

The present invention relates in general to data processing systems, and in particular, to a method and a system for storing data files in a file system.

Some types of applications have the characteristic of storing large numbers highly redundant (similar) unstructured data objects (files) in a file system. One example is an application processing and storing genomic sequence data of a large number of individuals of the same species. Such applications are being used more and more in the life science industry generating significant amount of data volume and storing these as a plurality of files in file systems. In the case of applications for genomic sequence data the scanning speed of genetic sequencers increases exponentially with each new generation leading to even more data hardly to be stored on storage devices for reasonable cost. Genetic sequencers use the application programming interface (API) of a file system. For network attached storage (NAS) the data are sent via a network protocol like Network File System protocol (NFS) or Server Message Broadcast protocol (SMB) or other alternative protocols to store the data in the NAS device using a file system internally. There are other application areas also generating very similar content to be stored in multiple files, for example applications recording, processing and storing seismic exploration data.

Some storage systems optimize storage capacity by eliminating identical copies of stored data. In some cases, stored data is divided into segments. A new segment that is desired to be stored is first compared against those segments already stored. If an identical segment is already stored on the system, a reference to that segment is stored instead of storing the new segment. This is referred to as identity compression.

Despite increasing capacities of storage systems and network links, there are often benefits to reducing the size of file objects that are stored and/or transmitted. Examples of environments that would benefit include mobile devices with limited storage, communication over telephone links, or storage of reference data, which is data that is written, saved permanently, and often never again accessed. Other examples include wide-area transfers of large objects, such as scientific data sets, or over saturated links. For example in self-contained storage systems, in which all data is stored in a single location, data can take the form of files in a file system, objects in a database, or other storage device.

Numerous techniques for reducing large object sizes exist including data compression, duplicate suppression, and delta encoding. Data compression is the elimination of redundancy internally within an object. Duplicate suppression is the process of eliminating redundancy caused by identical objects. Delta encoding or compression eliminates redundancy of an object relative to another object, which may be an earlier version of the object having the same name. A delta compression method, for example, optimizes storage capacity by comparing a new segment that is desired to be stored against those segments already stored and looking for a similar though not necessarily identical segment. If a similar segment is already stored on the system, a delta between the old and new segment is computed and a reference to the old segment and the delta is stored in place of the entire new segment.

In US 2011/0196869 A1 a method for cluster storage is disclosed. A storage system uses a cluster of nodes to store in-coming data. In-coming data is segmented. Each segment is characterized for assignment for storage on a given node. On the given node of the cluster, segments are stored in a manner that deduplicates segment storage.

Segments are deduplicated on each node of the cluster using delta compression. Delta compression allows the use of large segments for distributing efficiently to nodes so that sequential bytes are stored close to each other on disk. Delta compression efficiently stores segments that are similar to each other by storing one base and, for other similar segments, storing only a delta from the base along with a reference to the base. If a segment is not similar to a previously stored base, the new segment is stored as a new base and possibly a delta from that base.

SUMMARY

In one illustrative embodiment, a method, in a data processing system, is provided for storing data files in a file system. In the illustrative embodiment, the file system provides a plurality of reference data files and each reference data file in the plurality of data files represents a group of similar data files. The illustrative embodiment creates a new data file. The illustrative embodiment associates the new data file with one reference data file in the plurality of data files thus defining an associated reference data file of the plurality of reference data files. The illustrative embodiment informs the file system about the association of the new data file with the associated reference data file. The illustrative embodiment compresses the new data file using the associated reference data file thereby forming a compressed data file. The illustrative embodiment stores the compressed data file together with information about the association of the new data file with the associated reference data file.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The present invention together with the above-mentioned and other objects and advantages may best be understood from the following detailed description of the embodiments, but not restricted to the embodiments, wherein is shown in.

DETAILED DESCRIPTION

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

Figure 1:
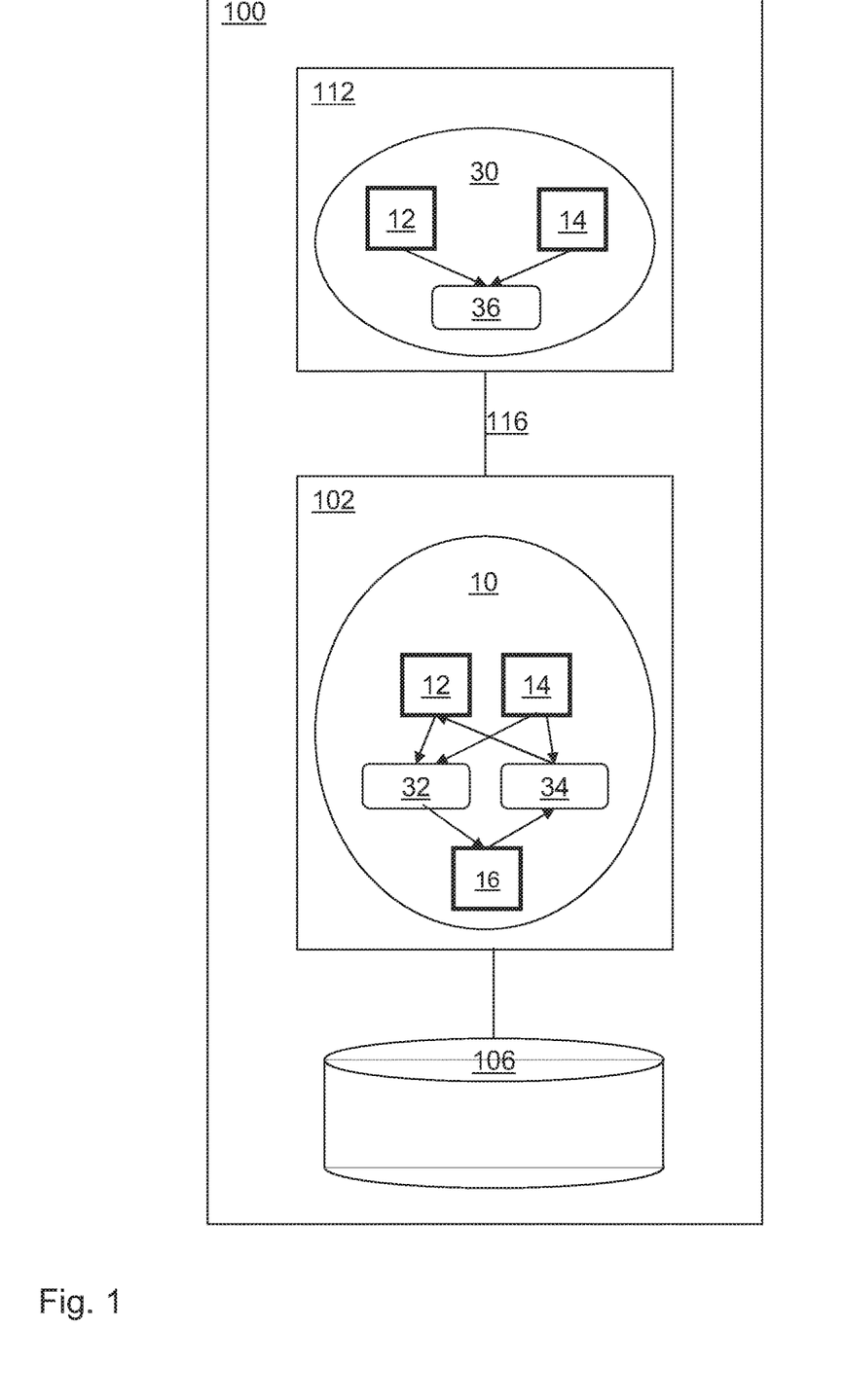
FIG. 1 depicts a system including a files association module and a compression module according to an example embodiment of the invention.

For illustrating the invention, FIG. 1 depicts a system 100 including a file association module 36 and a compression module 32 according to an example embodiment of the invention. The system 100 includes an application 30 running on a server 112, which on the other side is coupled via a network 116 to a server 102, where a file system 10 is configured to run. The file system 10 represents a file oriented interface to the application 30 such as a Network File System protocol (NFS) or a Server Message Broadcast protocol (SMB). The application 30 generates and processes sets of similar data files. A file association module 36 is integrated with the application 30 and is capable to analyze the content of said data files. This enables the file association module 36 to determine data files which are similar and group similar data files in groups or set of data files. This grouping can also be based on rules given by the application 30 or the file system 10. For example one rule can be that all data files of a certain type form one group. Another rule can be that all data files generated in a specific period of time pertain to one set of files. For each set of similar data files the file association module 36 can now automatically generate a reference data file 12. Finally the file association module 36 in conjunction with the application 30 stores a data file 14 in file system 10 via network 116 and thereby associates the data file 14 with said reference data file 12. A compression module 32 as well as a decompression module 34 are integrated in the file system 10. According to the invention a data file 14 may be compressed using the reference data file 12 to result in a compressed data file 16 which may be stored afterwards. Details are described in the following. The decompression module 34 may on the other hand serve for decompressing a compressed data file 16 using a reference data file 12 in order to restore the original data file 14.

The file system 10 is connected to a storage device 106 comprising hard disk drives or other storage devices according to prior art. File system 10 is the entity wherein files are being organized and stored on the storage device 106. There might be multiple file systems storing files on a single storage device 106 or a plurality of storage devices. A file system 10 contains an address space using names for the stored object, called name space. The file system 10, the servers 102, 112 and the storage device 106 can also be one system. Also multiple servers 102, 112 can build a cluster in scale out architecture. The file system 10 may be part of an operation system running on a server or may run as a firmware on a controller.

One example for an implementation of the inventive method is described based on a file system crawler (a computer program that browses a file system in a methodical, automated manner or in an orderly fashion). Deferring to FIG. 1, said file system crawler represents the application 30 including the file association module 36. The file system crawler analyzes data files stored in file system 10 in a directory structure. The file system 10 includes the compression module 32. Said file system crawler implements the following method to identify similar files, determine a reference data file for said similar data files and associate said reference data file with said identified similar data files, denoted by the following steps: the file system crawler selects a type of files such as, for example, text files or presentation files or spread sheets; the file system crawler determines data files of said selected file type stored in file system 10; among these files the file system crawler determines data files with similar content. This analysis can be based on a text analysis of the file or an analysis of the file structure. In one embodiment the file system crawler analyzes files with a similar file name stored in the same directory first. For said identified similar data files the file system crawler determines that part of the contents which each of said similar data files contains and stores this part of the content in a new file representing a reference data file. Said reference data file is also stored in file system 10. The file system crawler associates said similar data files with said reference data file by instructing the compression module 32 of the file system 10. Based on this instruction the compression module 32 of the file system 10 performs delta compression based on a prior art method for said similar data files using said reference data file.

Another example for an implementation of the inventive method is the use of storing genomic sequence data. The result of such scans is very large volumes of data, in the order of 20 to 40 TBytes of data, representing several scans of genomic sequences where the information about the individual is available, too. Such additional information can be utilized for associating reference data files based on the information of an individual. As an example, known relationships between individuals can be used for associating the same reference data file to genomic sequences based on the assumptions that individuals with a close relationship also share similar genomic sequences with a smaller set of differences compared to unrelated individuals. Based on the knowledge of relationships the same reference data file can be associated to a set of individuals to store their genomic sequence data by using delta compression. Due to the smaller amount of differences the delta compression based on an appropriate reference data file the required storage space is minimized. An example can be to use the genomic sequence data of a mother as the reference file for all children and grandchildren. The determination of such relationships is based on associated data about individuals providing genomic sequence data as in a patient data management system. Another use case is a set of genomic sequences being scanned from the same person. Differences in the genomic sequence, as created by viruses or mutations, are being stored as the result of the delta compression algorithm for each scan based on one reference genomic sequence. This may also allow storing mutations of the genomic sequence data over a longer period of time with just storing the delta. The relationship between different genomic sequences is also known by associated data being stored in a database containing the information about a patient like in a patient data management system.

For storing genomic sequence data based on delta compression the patient data management system represented as application 30 may utilize the file system 10 for storing genomic sequence data. Once an initial sequence data needs to be stored the application 30 determines this sequence as the reference data file as well. For any further data being stored the file association module 36 determines whether the stored data has a relationship to the previously stored reference data file. The determination can vary based on the information being available in the application 30. If the relationship of individuals belonging to the same family can be determined all genomic sequence data of members of this family can be associated with the reference data file being stored for the first member. In the case of storing multiple genomic sequence data for the same individual association can be done for the individual. The association based on the file system namespace can be used here i.e. if all data of the same individual is stored in the same directory. In this case the reference data file is associated by the file association module 36 to the according directory. The file association module 36 just needs to translate relationship into a directory structure being provided by the inventive system.

Figure 2:
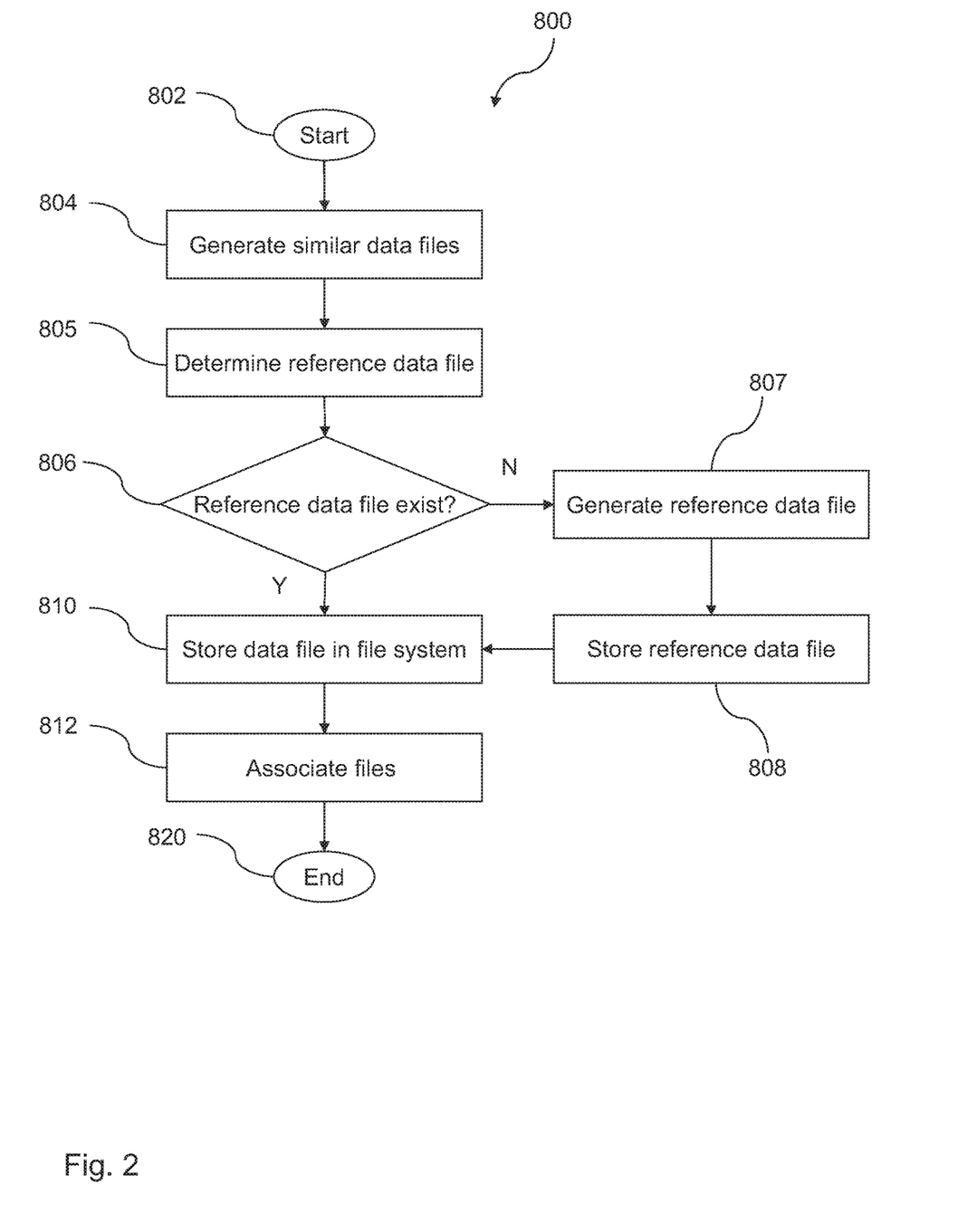
FIG. 2 depicts a file association and storage process according to an example embodiment of the invention.

FIG. 2 explains a file association and storage process 800 according to an example embodiment of the invention. The process 800 may be implemented in an application 30 and its embedded file association module 36. After start of the process in step 802 the application 30 generates similar data files 14 (FIG. 1) in step 804 and determines if there is a reference data file 12 (FIG. 1) for these similar data files 14 in step 805 by examining rules which are configured. In step 806 of the process 800 it is checked if the reference data file 12 exists already and if the answer is no the reference data file 12 will be created in step 807. In step 808 the reference data file 12 is stored and the process 800 continues to step 810.

If the reference data file 12 already existed in step 806 then the process 800 flows to step 810 where the data files 14 generated in step 804 are stored in the file system 10 (FIG. 1). In step 812 the process 800 associates the data files 14 with the reference data file 12 by sending an instruction to the file system 10. For example this instruction can be based on an existing file link command including a new option (parameter) which instructs the file system 10 to associate the reference data file 12 with the data file. Process 800 ends in step 820.

The association of the reference data file 12 with the data file 14 can be performed explicitly whereby the application instructs the file system 10 about this association (via file link command) or implicitly Whereby the reference data file 12 is associated with a sub-tree 28 (FIGS. 4 and 5) of the file system 10 and the application stores said data files 14 in said sub-tree 28.

Reference data files may be created by one of the following steps, (i) comparing a plurality of data files 14 concerning at least one of a part of a file content, a file type, an origin of the plurality of data files 14, (ii) determining similar data files in a file system 10 by a text analysis of the data files 14 and/or an analysis of a file structure of the data files 14, (iii) determining similar data files 14 in a file system 10 by determining similarity in file names of the data files 14 stored in a directory of the file system 10, (iv) determining a part of contents of said data files 14 being common to said data files 14, and finally storing the part of contents in a new data file representing the associated reference data file 12.

Figure 3:
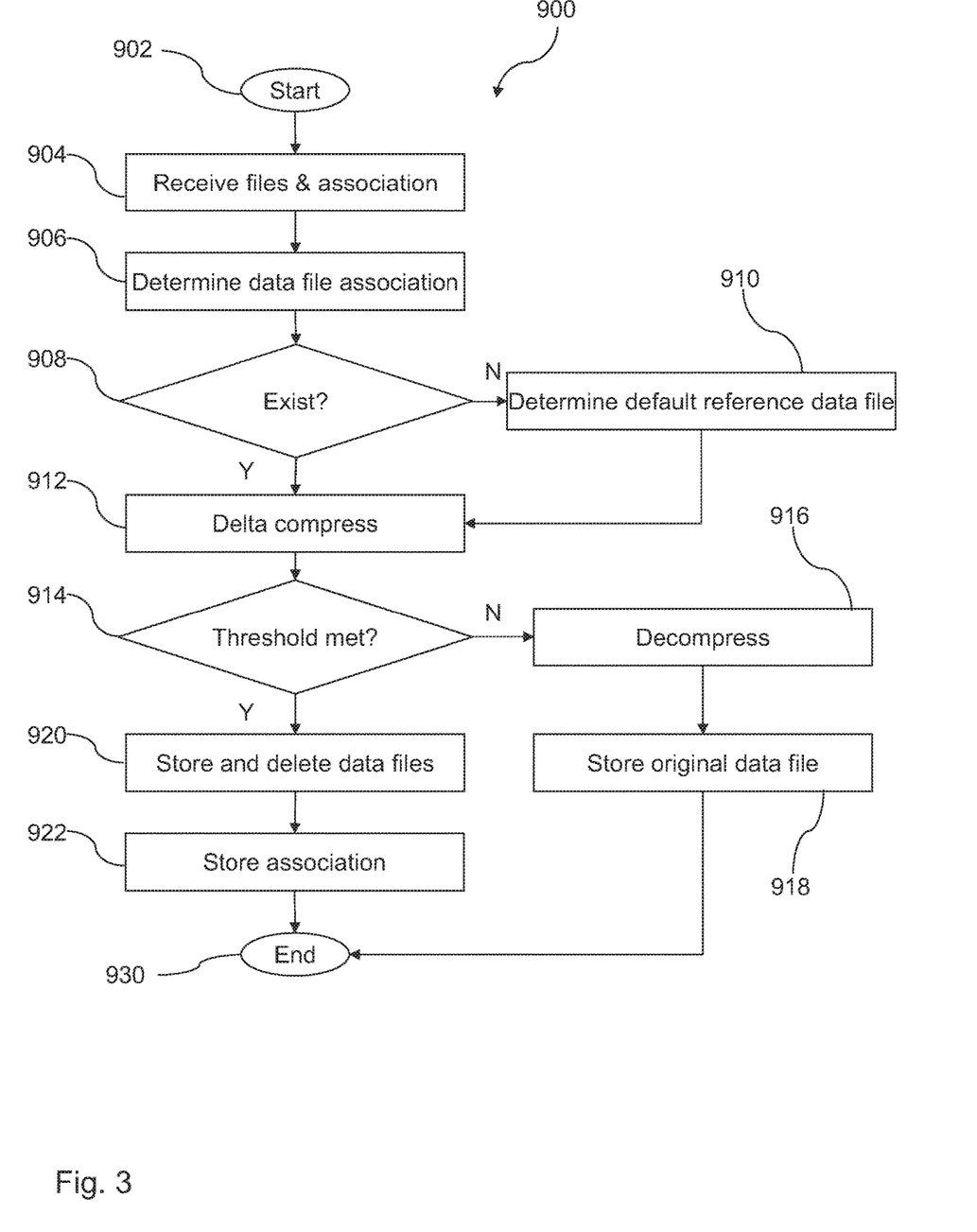
FIG. 3 depicts a delta compression process in a file system according to an example embodiment of the invention.
Figure 5:
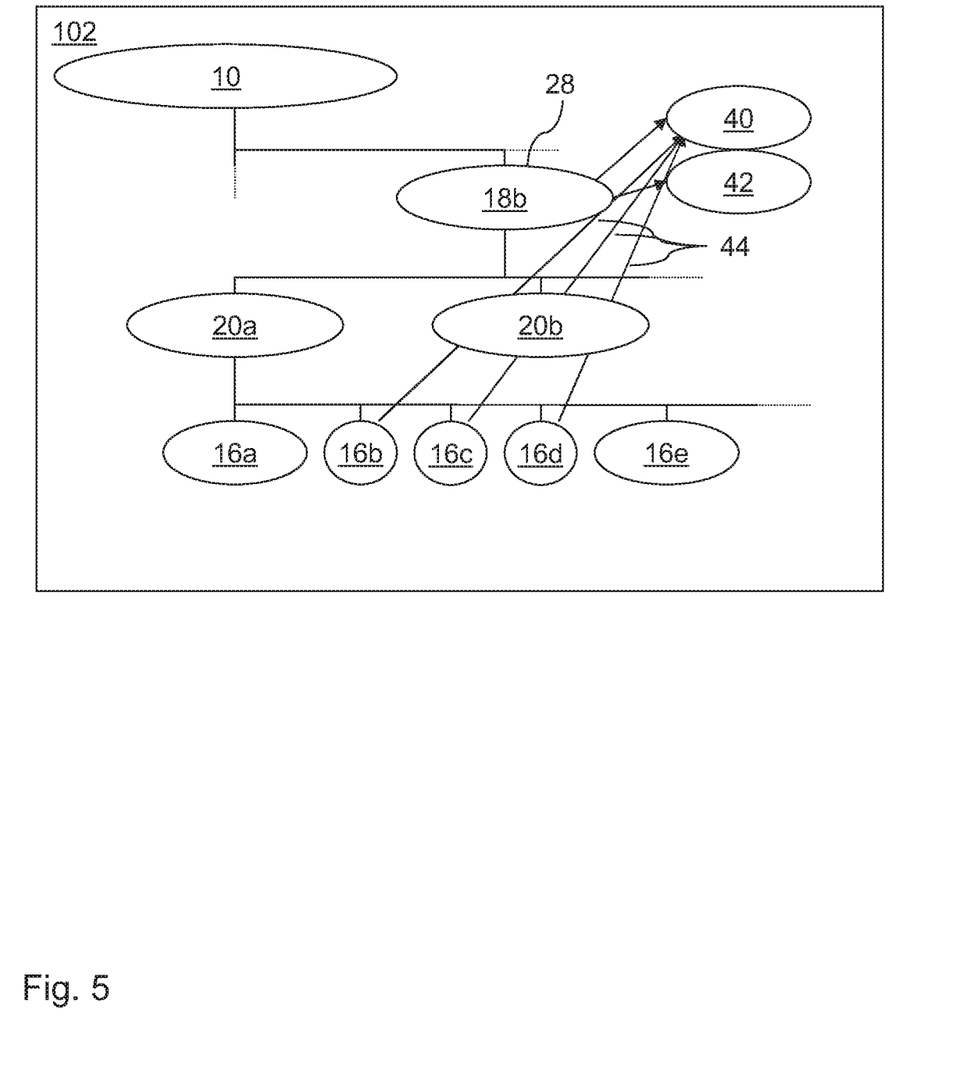
FIG. 5 depicts a file system with compressed data files maintaining a link to an associated reference data file according to an example embodiment of the invention.

FIG. 3 explains a delta compression process 900 in a file system 10, which may follow the file association and storage process 800 according to an example embodiment of the invention. Once the data files 14 and reference data file 12 is stored in the file system 10 (see FIG. 1), for example by the file association and storage process 800, the compression module 32 performs the compression of said data files 14 according to process 900. The process 900 is implemented in file system 10 and its embedded compression module 32. The process 900 starts in step 902 and continues to step 904 where the data files 14, the reference data file 12 and the association instruction coming from process 800 (steps 810 and 812 in FIG. 2) are received in the file system 10. In step 906 the process 900 determines the association of the data files 14 and reference data file 12 received in step 904 and determines in step 908 whether the reference data file 12 exists in the file system 10. If the reference data file 12 does not exist in the file system 10 the process 900 determines a default reference data file 12 in step 910. The default reference data file 12 can be set by an administrator of the file system 10. The default reference data file 12 is thereby associated with a sub-tree 28 of the file system 10, as shown in FIG. 5, in which the data files 14 are stored.

In step 912 the process 900 performs delta compression of said data files 14 according to prior art methods using said reference file 12 and a compression module 32 generating a delta compressed file 16 (FIG. 1). If both files contain very similar data this algorithm becomes effective and compression factors in a range between 90% to 99% becomes achievable. This information may be processed by a second prior art compression algorithm, like a jpeg algorithm for example, for compressing the delta information. Thus a further compression factor of greater than 1000 becomes realistic.

In step 914 the process 900 checks if the size of the delta compressed data file 16 against a configurable size threshold and if the threshold is exceeded the process 900 turns to step 916 where the delta compressed data file 16 is decompressed to form the original data file 14, if it was no longer available, using a decompression module 34. In step 918 the original data file 14 is stored in the file system 10 and the process 900 ends in step 930.

If the size of the delta compressed file 16 is determined to be below the threshold in step 914 the process 900 turns to step 920 where the original data file 14 is deleted and the delta compressed file 16 is stored in file system 10. Subsequently the process 900 stores the association information of the reference data file 12 in the delta compressed file 16 in step 922. In an example embodiment this information is stored in an inode (i.e. file structure information) of the delta compressed file 16. In an alternate embodiment this information may be stored in the attributes of the delta compressed file 16. The process 900 ends in step 930.

In one embodiment for large data files only a first portion of said data file 14 is compressed in step 912 and then checked against the size threshold in step 914. If the size threshold is exceeded upon compressing a first portion the original data file 14 is stored uncompressed in step 918. This embodiment allows to prevent resource intensive compression of large data files which are not compressible.

From a user or application 30 perspective the file system 10 presents the data files as original data files 14 even though the original data file 14 is compressed. This can be achieved naming the delta compressed data file 16 the same as the original data file 14 and showing the same attributes (especially size) through the interface of the file system 10.

Figure 4:
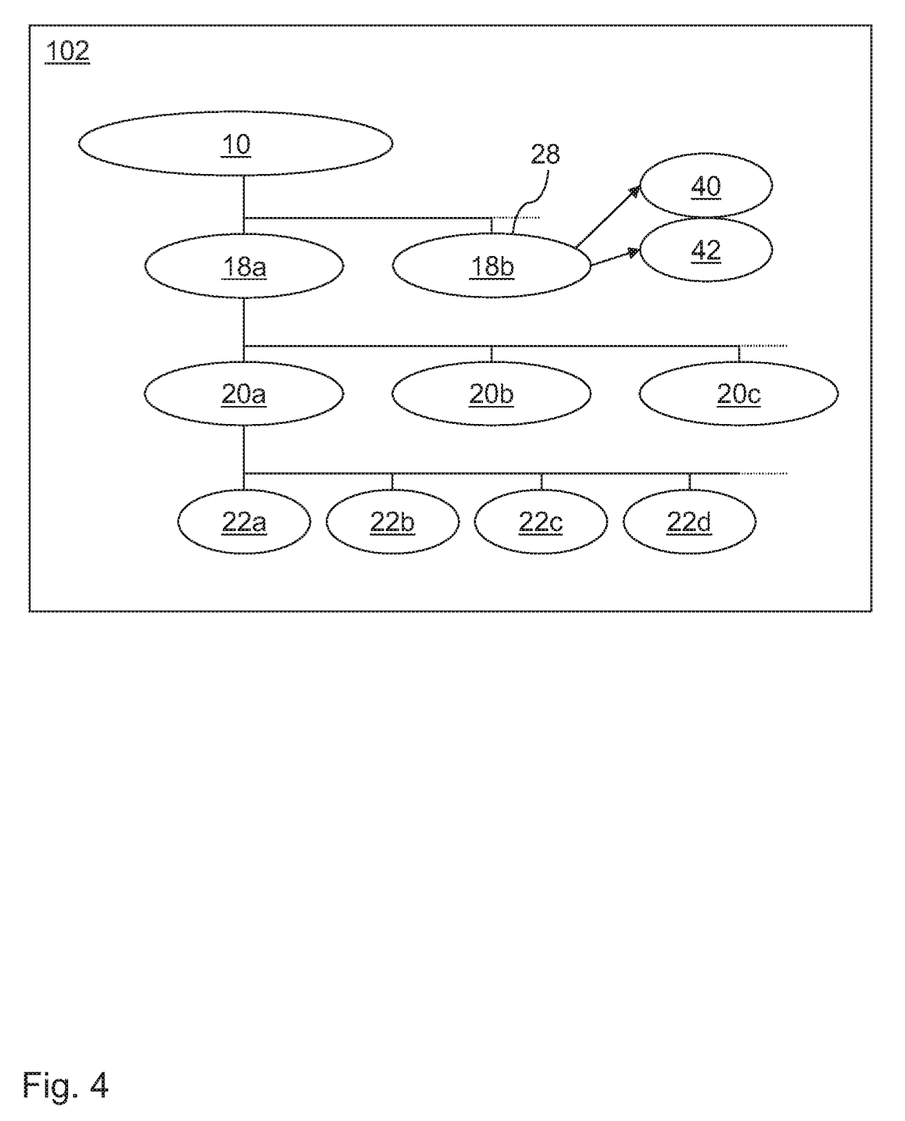
FIG. 4 depicts a file system structure depicting attributes for a reference data file based compression method according to an example embodiment of the invention.

In step 908 of process 900 in FIG. 3 the existence of a reference data file 12 associated with one or more data files 14 is checked and if there is no reference data file 12 associated with data files 14 or the reference data file 12 is not available the process 900 introduces the concept of a default reference file 12. Thereby the administrator of the file system 10 can associate reference data files 12 with directories or partitions of the file system 10. In step 910 of process 900 this association is checked. In FIG. 4 a concept of a static association of reference data files with file system directories or partitions is explained.

FIG. 4 shows a file system structure depicting attributes for a reference data file based compression method according to an example embodiment of the invention. FIG. 4 therefore shows a file system 10, within server 102, containing entities (directories or partitions) for subdividing the namespace and files. It divides the namespace in more manageable units allowing to apply attributes being used for rules on data file placements or other types of attributes. A sub-tree 28 of file system 10, file set 18b, has an associated attribute 40 including an association with a reference data file 12 and an attribute 42 associating a compression module 32. Once these attributes 40, 42 are associated to the file set 18b all data files being written into this file set 18b are interpreted as data files to be delta compressed using the compression module 32 associated by attribute 42 and the reference data file 12 associated by attribute 40. In addition, all data files in the remaining namespace of the file system 10, such as data files 18a, 20a, 22a-d, will be stored without any compression according to the example embodiment in FIG. 4. While the example just shows the association to a file set 18b the attributes can also be associated to the file system 10, or to directories or subdirectories 20a, 20b, 20c, . . . .

FIG. 5 depicts a file system 10 with compressed data files maintaining a link to an associated reference data file according to an example embodiment of the invention, as a part of the inventive method concerning static association of reference data files based on namespaces. FIG. 5 therefore shows the contents of a file system 10, within server 102, with an association of the attributes 40 and 42 to a sub-tree 28 of file system 10, file set 18b like in FIG. 4. After the association new data files are created and written to the file system 10 within the directory 20a. The directory 20a contained already a file 16a. Now a new data file 16b is created in the directory 20a. The data being written into this data file 16b are processed by the delta compression module 32 referenced in attribute 42 based on the reference data file 12 referenced in attribute 40. For keeping the relationship the delta compressed data file 16b maintains a link 44 to the reference data file of attribute 40. In file systems this relationship is represented within an inode (i.e. file structure information) of reference data file of attribute 40 in an inode of file 16b. Files 16c, 16d, and 16e are created and written later on in the same way. Assuming the data being written to files 16b, 16c, 16d, and 16e had a correlation like to genomes from two individuals the amount of stored data in these data files is significantly smaller.

Figure 6:
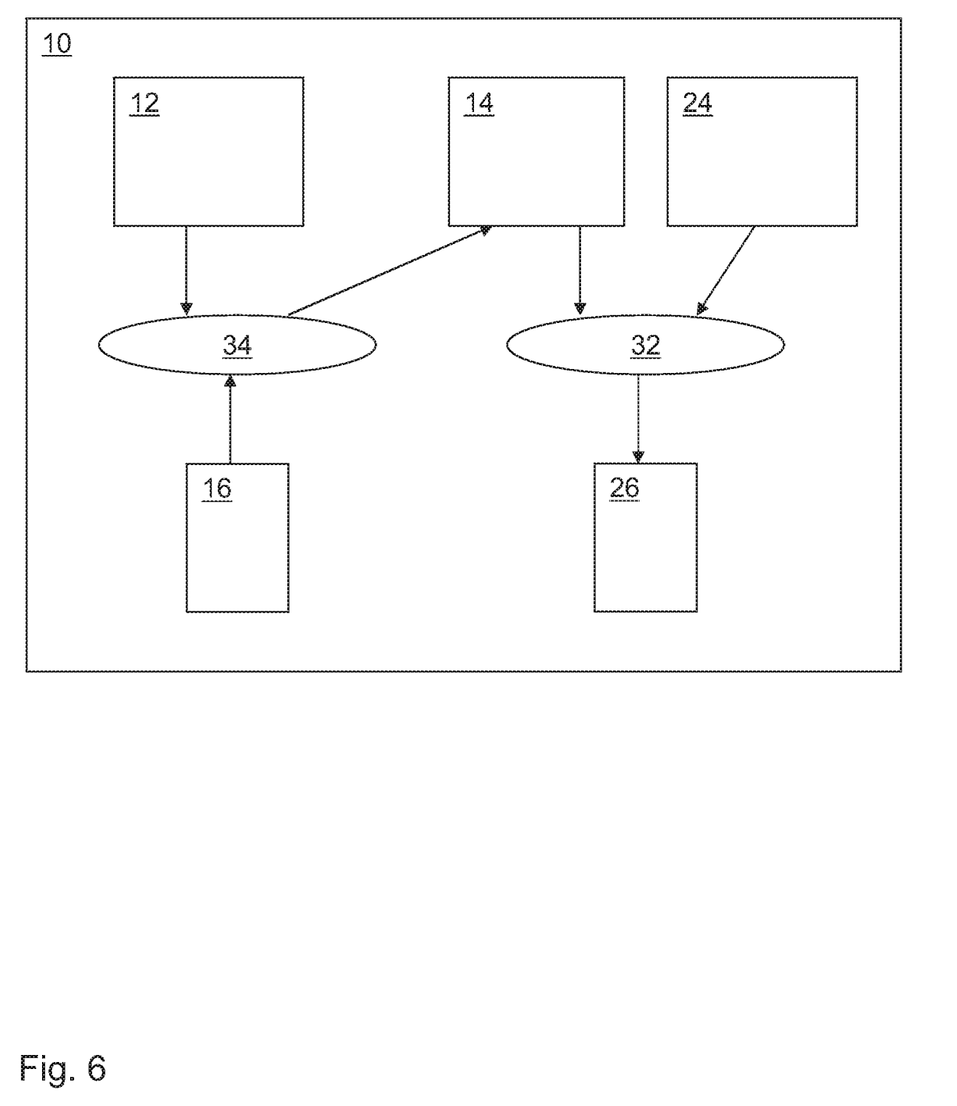
FIG. 6 depicts a transliteration process for a compressed data file from a previous reference data file to a new reference data file according to a further example embodiment of the invention.

Delta compressed data files 16 can also be re-associated with new reference data files 24 whereby the compression of these data files 16 will be performed using a new reference data file 24, as is shown in FIG. 6. This can be done explicitly whereby the application 30 instructs the file system 10 with its compression module 32 to associate a given data file 16 with a new reference data file 24 (for example via a file link command). Or this can be done implicitly whereby a compressed data file 16 is copied from one directory to another directory within the files system 10 and the new directory is associated with a different reference data file 24.

FIG. 6 explains this so-called transliteration process for a compressed data file 16, within files system 10, from a previous reference data file 12 to a new reference data file 24 according to a further example embodiment of the invention. The transliteration of a delta compressed file 16 is carried out by a decompression module 34 for extracting an uncompressed previous data file 14. In a second step of data processing the compression module 32 takes the file 14 as input and the data file 24 as the new reference data file. After processing the data files a new delta compressed data file 26 is being stored. The file 14 is stored temporarily. Alternatively, the output of the decompression module 34 is taken directly as the input of the compression module 32, not being stored in a file at all.

There are the following scenarios of handling an inheritance, i.e. a relationship to the correct associated reference data file, in detail:

Scenario 1: A data file 16 is copied or moved from one part of the namespace in a file system 10 into another one i.e. from one directory to another one. If different reference data files are associated to the source and target directory the data file is transliterated by the move operation as file 26. If contents of the file 16 are moved to file 26 the file 16 gets deleted. For a copy operation the file 16 is remaining unchanged.

Scenario 2: A delta compressed file 16 is copied or moved into another part of the namespace i.e. from one directory into another one. If the target directory has no associated reference data file the delta compressed file 16 needs to be decompressed and being stored in the original format. Depending on whether a copy or move operation is carried out the file 16 gets deleted or not.

Scenario 3: A new reference data file 24 is associated to a part of the namespace i.e. a directory. All delta compressed data files 16 being stored in this directory need to be transliterated to use the new reference data file 24.

Scenario 4: A reference data file 12 is being deleted. All delta compressed data files 16 being associated to this part of the namespace are decompressed into their original data file 14.

Access to delta compressed data file 16 might be accomplished by the following way. Next to saving space on the storage device 106 being used by the data files 16, a delta information of a data file 16 based on a reference data file 12 can be used for computations itself. The data can be made accessible by just decompressing the delta compressed data file 16. Depending on the capabilities of the file system API an application 30 might access the delta information as an alternate data stream or under a different file name.

Figure 7:
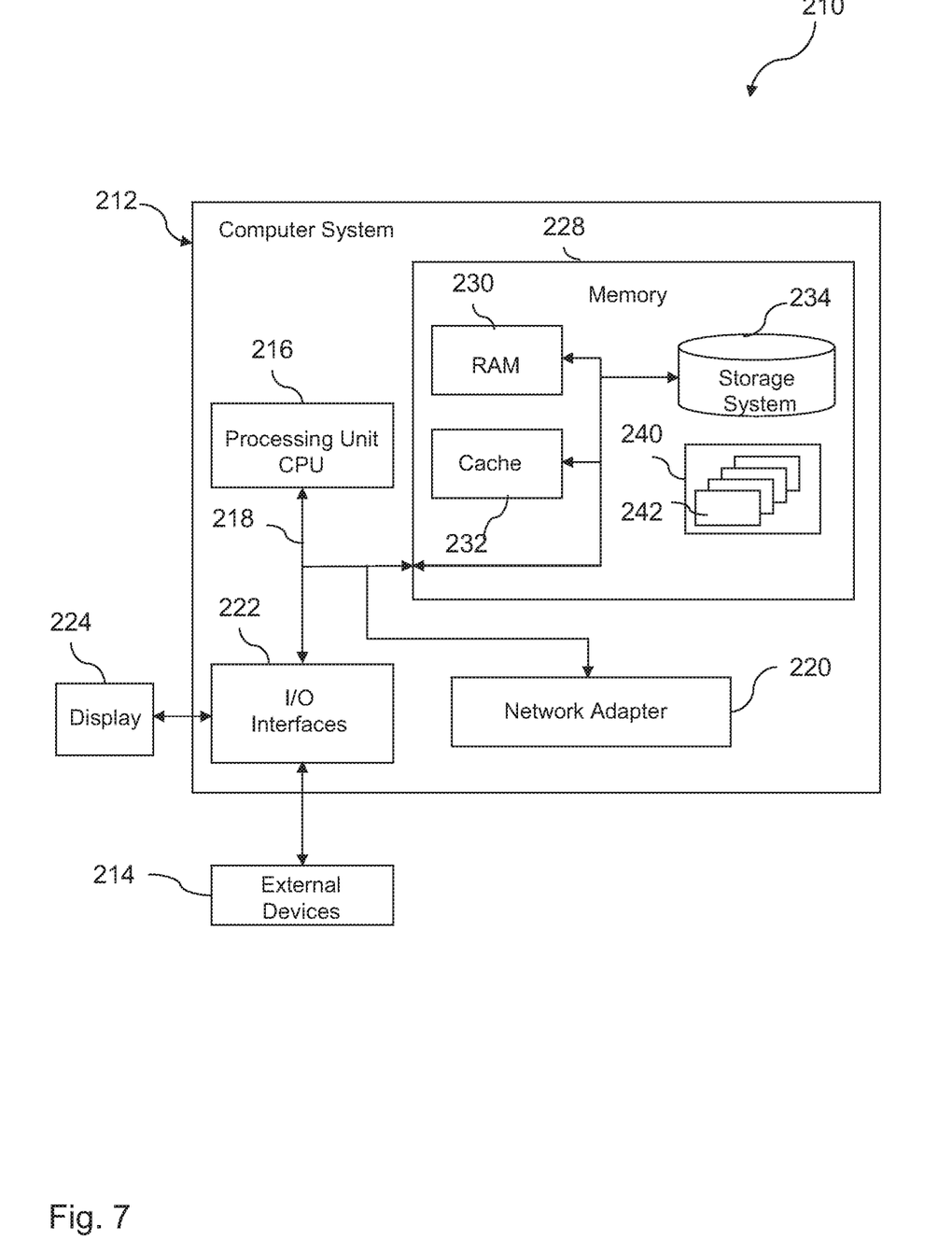
FIG. 7 depicts an example embodiment of a data processing system for carrying out a method according to the invention.

Referring now to FIG. 7, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Storage system 234 may also exhibit interfaces for separate storage media for the reference data files 12 than for the data files 14 and/or the compressed data files 16, as these reference data files 12 are the basis for a plurality of compressed data files 16 and may therefore be stored on separate storage media. Also the reference data files 12 may be backed up on separate backup media than the data files 14 and/or the compressed data files 16 as well as may be backed up on separate and/or multiple backup media of special performance and reliability.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein. Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the present invention may take the form of a computer program product embodied in one or more computer readable mediums) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Rash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to block diagrams of methods, apparatus (systems) and computer program products according to embodiments of the invention. It will be understood that each block of the flowchart illustrations and/or block diagrams, and combinations of blocks in the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions Which implement the function/act specified in the block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

The invention claimed is:

1. A method, in a data processing system, for storing data files in a file system, the method comprising:
    creating a new data file to be stored in the file system;
    identifying a plurality of data files in the file system that are similar to the new data file;
    comparing the plurality of data files to determine at least a portion of content that is common to the plurality of data files;
    generating a reference data file containing the at least a portion of content that is common to the plurality of data files;
    sending the new data file and the reference data file to the file system;
    storing the reference data file in the file system;
    compressing the new data file thereby forming a compressed data file that is smaller in size due to the new data file being represented as a difference between the new data file and the reference data file; and
    storing the compressed data file together with a link to the reference data file the in the file system.

2. The method according to claim 1, wherein the plurality of data files in the file system are identified based on at least one of a part of a file content, a file type, or an origin of the plurality of data files.

3. The method according to claim 1, wherein the plurality of data files in the file system are identified based on a text analysis of the data files or an analysis of a file structure of the data files.

4. The method according to claim 1, wherein the the plurality of data files in the file system are identified by determining a similarity in file names of the data files stored in a directory of the file system.

5. The method according to claim 1, further comprising:
    associating the reference data file with a sub-tree of the file system; and
    storing the new data file in the sub-tree.

6. The method according to claim 1, further comprising informing the file system about an association between the new data file and the reference data file via a file link command.

7. The method according to claim 1, wherein compressing the new data file is performed by a delta compressing method.

8. A computer program product comprising a non-transitory computer readable storage medium having a computer readable program stored therein, wherein the computer readable program, when executed on a computing device, causes the computing device to:
- create a new data file to be stored in the file system;
- identify a plurality of data files in the file system that are similar to the new data file;
- compare the plurality of data files to determine at least a portion of content that is common to the plurality of data files;
- generate a reference data the containing the at least a portion of content that is common to the plurality of data files;
- send the new data file and the reference data file to the file system;
- store the reference data file in the file system;
- compress the new data file thereby forming a compressed data file that is smaller in size due to the new data file being represented as a difference between the new data file and the reference data file; and
- store the compressed data file together with a link to the reference data file in the file system.

9. The computer program product according to claim 8, wherein the plurality of data files in the file system are identified based on at least one of a part of a file content, a file type, or an origin of the plurality of data files.

10. The computer program product according to claim 8, wherein the plurality of data files in the file system are identified based on a text analysis of the data files or an analysis of a file structure of the data files.

11. The computer program product according to claim 8, wherein the the plurality of data files in the file system are identified by determining a similarity in file names of the data files stored in a directory of the file system.

12. The computer program product according to claim 8, wherein the computer readable program further causes the computing device to:
- associate the reference data file with a sub-tree of the file system; and
- store the new data file in the sub-tree.

13. The computer program product according to claim 8, wherein the computer readable program further causes the computing device to inform the file system about an association between the new data file and the reference data file via a file link command.

14. A data processing system comprising:
- a processor; and
- a memory coupled to the processor, wherein the memory comprises instructions which, when executed by the processor, cause the processor to:
- create a new data file to be stored in the file system;
- identify a plurality of data files in the file system that are similar to the new data file;
- compare the plurality of data files to determine at least a portion of content that is common to the plurality of data files;
- generate a reference data file containing the at least a portion of content that is common to the plurality of data files;
- the new data file and the reference data file to the file system;
- store the reference data file in the file system;
- compress the new data file thereby forming a compressed data file that is smaller in size due to the new data file being represented as a difference between the new data file and the reference data file; and
- store the compressed data file together with a link to the reference data file in the file system.

15. The data processing system according to claim 14, wherein the plurality of data files in the file system are identified based on at least one of a part of a file content, a file type, or an origin of the plurality of data files.

16. The data processing system according to claim 14, wherein the plurality of data files in the file system are identified based on a text analysis of the data files or an analysis of a file structure of the data files.

17. The data processing system according to claim 14, wherein the the plurality of data files in the file system are identified by determining a similarity in file names of the data files stored in a directory of the file system.

18. The data processing system according to claim 14, wherein the instructions further cause the processor to:
- associate the reference data file with a sub-tree of the file system; and
- store the new data file in the sub-tree.

19. The data processing system according to claim 14, wherein the instructions further cause the processor to inform the file system about an association between the new data file and the reference data file via a file link command.

20. The data processing system according to claim 14, wherein compressing the new data file is performed by a delta compressing method.

* * * * *